UNITED STATES PATENT OFFICE 2,567,245

ARYL-(2-PYRIDYL)-AMINO ALKANES AND THEIR PRODUCTION

Nathan Sperber, Bronx, and Domenick Papa, Brooklyn, N. Y., and Erwin Schwenk, Montclair, N. J., assignors to Schering Corporation, Bloomfield, N. J., a corporation of New Jersey No Drawing. Application May 10, 1948, Serial No. 26,246

15 Claims. (Cl. 260—296)

The invention relates to new substances of interesting and important physiological properties and more particularly to pyridyl substituted alkanes which have been found to be highly effective against histamine-induced allergic reactions and to methods of making the same.

It is recognized that the liberation of histamine into the tissues, which can be brought about by a multitude of agents or processes, is primarily responsible for many of the allergic manifestations in man. It has been found that certain substances of closely related chemical configurations are effective in alleviating the symptoms of many allergic reactions. The specificity of these chemical substances for the control of allergic reactions is well demonstrated by the researches carried on within the last ten years. However, although the substances prescribed at the present time represent a remarkable advance, they exhibit many undesirable side effects, or so-called toxic reactions, among which may be mentioned the high incidence of drowsiness, dizziness, nausea, gastro-intestinal irritation and dryness of the mouth.

It has been generally considered that only those substances which are derivatives of ethanolamine and ethylenediamine show pronounced anti-histaminic and anti-anaphylactic activity. We have now found that pyridyl aliphatic amines of the following general formula

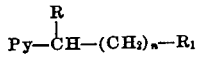

wherein Py is a member of the group consisting of pyridine and lower alkyl substituted pyridine rings, R is a phenyl nucleus, $R_1$ is a member of the group consisting of dialkylamino, morpholino and piperidino groups, and $n$ is an integer not less than 2 and not more than 4, and the salts thereof have a high degree of anti-histaminic activity. The phenyl nucleus R may contain one or more substituents such as lower alkyl and lower alkoxy groups, hydroxyl and groups convertible thereto by hydrolysis, halogens, amino, alkylamino, acylamino, nitro, carboxy and carbalkoxy.

Clinical studies with representative members of the compounds of this invention have demonstrated extremely favorable anti-histaminic activity. This high order of activity is accompanied by relative freedom from side effects. Particularly important is the comparative absence of any sedation, dizziness or depression in more than 90% of the cases treated. This advantage is of extreme importance in the clinical application of anti-histaminic drugs.

Inclusion in the phenyl nucleus of various substituents, as indicated above, does not substantially alter the qualitative anti-histaminic activity of the compounds, but in general alters slightly the amount of anti-histaminic activity or the toxicity as compared with the corresponding compound having an unsubstituted phenyl nucleus.

In general, the compounds of the invention may be made by the hydrolysis and decarboxylation of the related nitriles. The preparation and properties of nitriles suitable for conversion into the compounds of the invention are described in our copending application Ser. No. 779,638, filed October 13, 1947, now abandoned, for Pyridyldialkylaminoalkane Nitriles. When the nitriles of the copending application are treated with a strong acid, such as concentrated sulfuric acid or concentrated hydrohalic acids, the nitriles are hydrolysed and decarboxylated to the compounds of the invention as illustrated by the following equation:

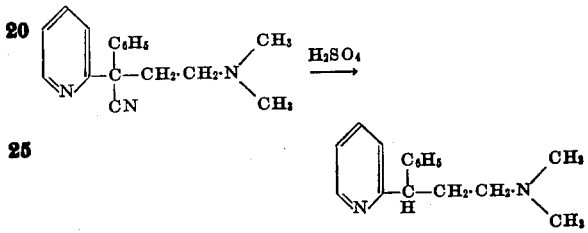

The compounds of the invention may also be prepared by condensing the appropriate dialkylaminoalkyl halide with either 2- or 4-benzylpyridine using butyllithium, sodamide or potassium amide as a condensing catalyst.

The reaction is illustrated by the following equation:

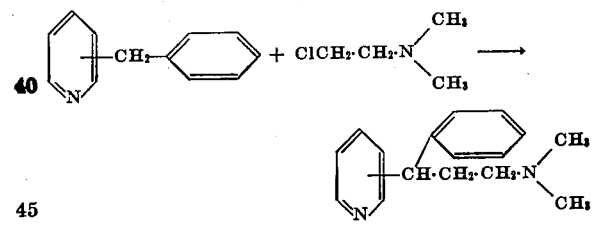

The 2- and 4-benzylpyridines are readily obtained by the condensation of benzyl chloride with pyridine in the presence of a catalytic amount of copper powder. Separation of the isomers is effected by fractional distillation. In place of benzyl chloride substituted derivatives such as p-methoxy-, p-methyl-, and p-isopropyl-benzyl chloride may be used.

The compounds of the invention may also be made by converting pyridyl aryl carbinols, such as are described in applications Ser. No. 718,624, filed December 26, 1946, and Ser. No. 1,898, filed January 12, 1948, to the corresponding halides, reducing the halides to the pyridyl aryl methanes and condensing the methanes with a dialkylaminoalkyl halide using butyllithium, sodamide or potassium amide as a condensing catalyst. The halogenation of the carbinols may be readily effected by halogenating agents such as thionyl chloride, and the removal of the halogen may be effected by reducing agents such as zinc and acetic acid.

The following specific examples are illustrative of the methods and products of the invention:

EXAMPLE I

*3-phenyl-3-(2-pyridyl)-N,N-dimethylpropylamine*

To 400 g. of α-phenyl-α-(β-dimethylaminoethyl)-2-pyridylacetonitrile there is added 2000 g. of 80% sulfuric acid. The mixture is heated with stirring at 140–150° C. for 24 hours. After decomposing with ice and water, the aqueous sulfuric acid solution is made alkaline with ammonia gas. The oil which separates out is extracted with ether, the extract is dried, and, after removing the ether, the residue is distilled giving the 3-phenyl-3-(2-pyridyl)-N,N-dimethylpropylamine, B. P. 139–142° C./1–2 mm.

The hydrolysis and decarboxylation may be carried out with sulfuric acid varying in concentration from 60% to the concentration of commercial concentrated sulfuric acid. In general, the time and temperature of the reaction can be varied over the ranges of 6 to 24 hours and 50–140° C.

In addition to the hydrolysis and decarboxylation of the nitriles with sulfuric acid, the conversion may be effected in other ways: For example:

(a) One part of the nitrile and ten parts of 48% hydrobromic acid are refluxed for a period of 50–60 hours. The aqueous hydrobromic acid is removed in vacuo. The residue is made alkaline with gaseous ammonia and the oil which separates is extracted with ether. The ether residue is treated with a saturated alcoholic solution of picric acid heated to boiling and filtered. The insoluble picrate is washed with boiling alcohol. This purification process removes any starting material which, unlike the amine, forms an alcohol soluble picrate. The insoluble picrate is then decomposed with dilute sodium hydroxide, the amine is isolated by extraction with ether and purified by distillation.

(b) To one part of the nitrile there is added five parts of 80% sulfuric acid and one part of 48% hydrobromic acid. The mixture is heated at a temperature of 130–140° C. for about 30–40 hours and the reaction mixture worked up as in method (a).

(c) One part of the nitrile is refluxed with concentrated hydrochloric acid for about 60 hours. The amine thus formed is isolated and purified as described under method (a).

(d) The cyanide group may also be removed by treating the nitrile with sodamide, for example, by refluxing the nitrile with one mole of sodamide in toluene or xylene for 6 to 15 hours.

EXAMPLE I-A

The 3-phenyl-3-(2-pyridyl)-N,N-dimethylpropylamine of Example I may also be made as follows:

To 1.0 mole of potassium amide in 3 liters of liquid ammonia, are added 1.0 mole of 2-benzylpyridine. After 15 minutes, 1.1 moles of β-dimethylaminoethyl chloride are added. The ammonia is allowed to evaporate and the reaction product decomposed with water and ether extracted. The ether layer is dried over sodium sulfate and after evaporation the residue is distilled.

The following compounds having substantial antihistaminic activity may be made from the corresponding nitriles by the methods of Example I:

EXAMPLE II 3-phenyl-3-(2-pyridyl)-N,N-diethylpropylamine, a yellow oil boiling at 156° C./1 mm., from α-phenyl-α-(β-diethylaminoethyl)-2-pyridylacetonitrile.

EXAMPLE III 3-(p-methylphenyl)-3-(2-pyridyl)-N,N-dimethyl-propylamine, boiling at about 130–135° C./0.5 mm., from α-(p-methylphenyl-α-(β-dimethylaminoethyl)-2-pyridylacetonitrile.

EXAMPLE IV 3-(p-methoxyphenyl)-3-(2-pyridyl)-N,N-dimethylpropylamine, boiling at about 137–142° C./0.5 mm., from α-(p-methoxyphenyl)-α-(β-dimethylaminoethyl)-2-pyridylacetonitrile.

EXAMPLE V 3-(p-isopropylphenyl)-3-(2-pyridyl)-N,N-dimethylpropylamine, boiling at 144–147° C./1 mm., from α-(p-isopropylphenyl)-α-(β-dimethylaminoethyl-2-pyridylacetonitrile.

EXAMPLE VI 3-phenyl-3-(6-methyl-2-pyridyl)-N,N-dimethylpropylamine, boiling at 171–175° C./1 mm., from α-(β-dimethylaminoethyl)-2-(6-methyl-2-pyridyl)-phenylacetonitrile.

EXAMPLE VII 3-(p-bromophenyl)-3-(2-pyridyl)-N,N-dimethylpropylamine, boiling at about 147–152° C./0.5 mm., from α-(p-bromophenyl)-α-(β-dimethylaminoethyl)-2-pyridylacetonitrile.

EXAMPLE VIII 4-phenyl-4-(2-pyridyl)-2-(dimethylamino)-butane, from α-phenyl-α-(2-pyridyl)-γ-(dimethylamino)-valeronitrile.

EXAMPLE IX 4-phenyl-4-(2-pyridyl)-N,N-dimethylbutylamine, from α-phenyl-α-(2-pyridyl)-γ-(dimethylaminomethyl)-butyronitrile.

EXAMPLE X 3-(p-chlorophenyl)-3-(2-pyridyl)-N,N-dimethylpropylamine, boiling at 142° C./1 mm., from α-(p-chlorophenyl)-α-(β-dimethylaminoethyl)-2-pyridylacetonitrile.

EXAMPLE XI 3-(o-chlorophenyl)-3-(2-pyridyl)-N,N-dimethylpropylamine, boiling at 142° C./1 mm., from α-(o-chlorophenyl)-α-(β-dimethylaminoethyl)-2-pyridylacetonitrile.

EXAMPLE XII

*3-(2,3-dimethoxyphenyl)-3-(2-pyridyl)-N,N-dimethylpropylamine*

2,3-dimethoxyphenyl-(2-pyridyl)carbinol is prepared by the reaction of 2,3-dimethoxybenzaldehyde and picolinic acid as follows:

A mixture of ten parts of 2,3-dimethoxybenzaldehyde, four parts of picolinic acid and twenty-five parts of cymene are heated for approximately 4-6 hours at 160-170° C. Upon cooling, the reaction product is extracted with aqueous hydrochloric acid and the resulting acid extracts are made alkaline with gaseous ammonia. The dimethoxyphenyl pyridyl carbinol is extracted with ether, the ether washed with water, dried, and, after removal of the ether, the residue is distilled.

To a solution of ten parts of the dimethoxyphenyl pyridyl carbinol in 60 parts of anhydrous benzene cooled to 0° C., there is added dropwise 6.5 parts of thionyl chloride. After the addition is completed, the reaction is allowed to reach room temperature. After standing for several hours, the excess thionyl chloride is cautiously decomposed with 10% potassium hydroxide solution so that the resulting mixture is strongly alkaline. The benzene layer is separated, dried over sodium sulfate, filtered and vacuum concentrated. The resulting deep red residue is transferred to a one-liter, three-necked flask provided with a condenser and 50 parts of glacial acetic acid added. With stirring, 11 parts of zinc dust are added with external cooling, if necessary. After stirring and heating for six hours, the reaction mixture is worked up in the known manner to yield the 2,3-dimethoxybenzylpyridine. Condensation of this benzylpyridine with β-dimethylaminoethyl chloride is carried out as described for the corresponding unsubstituted compound. The compound of this example is obtained as a viscous liquid boiling at approximately 195–200° C./1–2 mm.

EXAMPLE XIII

*3-(3,4-dimethoxyphenyl)-3-(2-pyridyl)-N,N-dimethylpropylamine*

This compound is prepared as described for the 2,3-isomer using veratraldehyde in place of the 2,3-dimethoxybenzaldehyde.

EXAMPLE XIV

*3-(2,4-dichlorophenyl)-3-(2-pyridyl)-N,N-dimethylpropylamine*

This compound is obtained in accordance with the instructions of Example XII when 2,4-dichlorobenzaldehyde is substituted for the 2,3-dimethoxybenzaldehyde. The propylamine is obtained as a viscous yellow liquid.

EXAMPLE XV

*3-(2,4-dimethylphenyl)-3-(2-pyridyl)-N,N-dimethylpropylamine*

By substituting 2,4-dimethylbenzaldehyde for 2,3-dimethoxybenzaldehyde in Example XII, the compound of this example is obtained as a yellow viscous liquid.

EXAMPLE XVI

*3-phenyl-3-(2-pyridyl)-N-piperidino propane*

2-benzylpyridine is condensed with potassium amide in liquid ammonia with β-N-piperidino ethyl chloride to yield the compound of this example. It is a viscous yellow liquid boiling at 160–165° C./1–2 mm. It may also be obtained by the method of Example I from α-phenyl-α-(β-N-piperidino)-2-pyridylacetonitrile. This nitrile, boiling at 180–188° C./1–2 mm., may be made by condensing β-N-piperidino ethyl chloride with phenyl-2-pyridylacetonitrile.

EXAMPLE XVII

*3-phenyl-3-(2-pyridyl)-N-morpholino propane*

By substituting β-N-morpholino ethyl chloride for β-N-piperidino ethyl chloride in Example XVI, the compound of this example is obtained.

EXAMPLE XVIII

*3-(p-hydroxyphenyl)-3-(2-pyridyl)-N,N-dimethylpropylamine*

By demethylating with hydrobromic and acetic acids or with pyridine hydrochloride, the methoxy compound of Example IV, there is obtained the corresponding hydroxy compound as a very viscous liquid which partly solidifies. It boils at 210° C./2 mm.

EXAMPLE XIX

*3-(4-dimethylaminophenyl)-3-(2-pyridyl)-N,N-dimethylpropylamine*

By substituting p-dimethylaminobenzaldehyde for 2,3-dimethoxybenzaldehyde used in Example XII, the propylamine of this example is obtained as a yellow, somewhat viscous liquid boiling at 183–185° C./1.5 mm.

EXAMPLE XX

*3-(3-aminophenyl)-3-(2-pyridyl)-N,N-dimethylpropylamine*

By substituting m-nitrobenzaldehyde for the 2,3-dimethoxybenzaldehyde of Example XII, there is obtained the compound of this example. In the course of making the substituted benzylpyridine, the nitro group is reduced to the amine in the zinc-acetic acid treatment. Prior to reacting the amino substituted benzylpyridine with β-dimethylaminoethyl chloride, the amino group is protected by any suitable means such as acetylation.

EXAMPLE XXI

*3-(3-acetylaminophenyl)-3-(2-pyridyl)-N,N-dimethylpropylamine*

This substance is obtained from the compound of the preceding example by treatment with acetic anhydride according to the known methods.

The compounds of the invention may be used in the form of the free bases or in the form of the salts thereof with inorganic acids such as hydrochloric, hydrobromic, sulfuric and phosphoric acids and organic acids, such as salicylic, tartaric, maleic, succinic, citric and lactic acids.

Typical examples of salts of the 3-phenyl-3-(2-pyridyl)-N,N-dimethylpropylamine of Example I are the following:

1. The mono-hydrochloride is obtained by passing anhydrous hydrochloric acid into an ether solution of the γ-phenyl-γ-(2-pyridyl)-N,N-dimethylpropylamine. The hydrochloride can be recrystallized from absolute alcohol and absolute ether and melts at 117–119° C.

2. The tartrate of the compound of Example I is obtained in the usual manner and melts at 114–115° C.

3. The mono-hydrogen oxalate is prepared in ethanol and after recrystallization from acetone melts at 152–152.5° C.

4. The mono-hydrogen succinate is prepared in a manner similar to the mono-hydrogen oxalate in ethyl alcohol solution and after recrystallization from pentanol melts at 99.5–100° C.

5. The mono-hydrogen maleate is similarly prepared and after recrystallization from pentanol, melts at 106–107° C.

The compounds may be used in a variety of forms, such as tablets for oral administration, creams for topical application, and injectible solutions. Preferably the salts of the compounds are used in the creams which may be of the usual formulations. The injectible solutions preferably comprise non-toxic salts in admixture with sodium carbonate and boric acid and are sterilized before use.

This application is a continuation-in-part of our application Serial No. 782,688 filed October 28, 1947, now abandoned, and contains subject matter in common with our application Serial No. 20,108, filed April 9, 1948, now abandoned.

Subject matter disclosed in this application and related subject matter is claimed in applicants' copending applications Serial No. 166,768 filed June 7, 1950, Serial No. 174,358 filed July 17, 1950, and Serial No. 178,166 filed August 7, 1950.

We claim:

1. Compounds of the group consisting of bases of the general formula

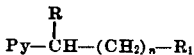

wherein Py is a member of the group consisting of pyridine and lower alkyl substituted pyridine rings; R is a phenyl nucleus; $R_1$ is a member of the group consisting of dialkylamino, morpholino and piperidino groups; and $n$ is one of the integers 2 to 4, and the non-toxic salts thereof.

2. 3 - phenyl - 3 - (2-pyridyl) - N,N - dimethylpropylamine.

3. 3 - (p-methoxyphenyl) - 3 - (2-pyridyl) - N,N-dimethylpropylamine.

4. 3 - (p-isopropylphenyl) - 3 - (2-pyridyl) - N,N-dimethylpropylamine.

5. 3 - (p-chlorophenyl) - 3 - (2-pyridyl) - N,N-dimethylpropylamine.

6. 3 - (4 - dimethylaminophenyl) - 3 - (2-pyridyl) -N,N-dimethylpropylamine.

7. A method of hydrolysing and decarboxylating a nitrile of the general formula

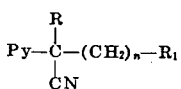

wherein Py is a member of the group consisting of pyridine and lower alkyl substituted pyridine rings, R is a phenyl nucleus, $R_1$ is a member of the group consisting of dialkylamino, morpholino and piperidino groups and $n$ is one of the integers 2 to 4, which comprises heating the nitrile with a concentrated mineral acid and recovering the compound thereby produced of the formula

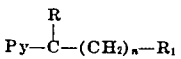

wherein Py, R, $R_1$ and $n$ are as defined above.

8. A method as defined in claim 7 in which the nitrile is heated with 80% sulfuric acid.

9. Compounds of the following formula

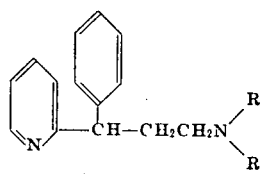

where R is a lower alkyl radical.

10. Compounds of the formula

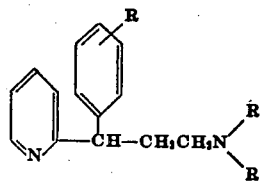

where R is a lower alkyl radical.

11. Compounds of the formula

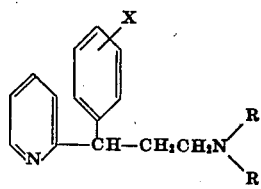

where X is an halogen of atomic number not less than 17 and not more than 35 and R is a lower alkyl group.

12. Compounds of the formula

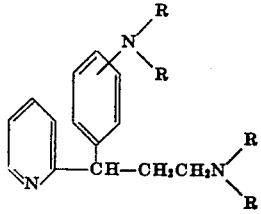

where R is a lower alkyl group.

13. Compounds of the formula

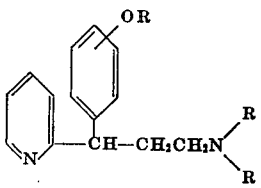

where R is a lower alkyl group.

14. Compounds of the general formula

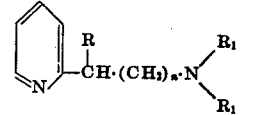

wherein R is a phenyl nucleus, $R_1$ is a lower alkyl group and $n$ is an integer from 2 to 4.

15. Compounds as defined in claim 14 wherein $n$ is 2.

NATHAN SPERBER.
DOMENICK PAPA.
ERWIN SCHWENK.

REFERENCES CITED

The following references are of record in the file of this patent:

UNITED STATES PATENTS

| Number | Name | Date |
|---|---|---|
| 2,398,575 | Bergel et al. | Apr. 16, 1946 |

FOREIGN PATENTS

| Number | Country | Date |
|---|---|---|
| 883,439 | France | July 7, 1943 |

OTHER REFERENCES

Compt. Rend., 139, 317–318 (1903).

Sidgwick: Organic Chemistry of Nitrogen, page 522 (1945).

Hartman: California Medicine 66, 245–246 (1947).